United States Patent
Chang et al.

(10) Patent No.: US 9,274,832 B2
(45) Date of Patent: Mar. 1, 2016

(54) METHOD AND ELECTRONIC DEVICE FOR THREAD SCHEDULING

(71) Applicant: HTC Corporation, Taoyuan County (TW)

(72) Inventors: Wen-Yen Chang, Taoyuan County (TW); Chih-Tsung Wu, Taoyuan County (TW); Ting-Lun Chen, Taoyuan County (TW); Kao-Pin Chen, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 374 days.

(21) Appl. No.: 13/762,329

(22) Filed: Feb. 7, 2013

(65) Prior Publication Data

US 2014/0223437 A1     Aug. 7, 2014

(51) Int. Cl.
G06F 9/48 (2006.01)

(52) U.S. Cl.
CPC ........ *G06F 9/4881* (2013.01); *G06F 2209/486* (2013.01)

(58) Field of Classification Search
None
See application file for complete search history.

(56) References Cited

U.S. PATENT DOCUMENTS

| | | | |
|---|---|---|---|
| 4,642,756 A * | 2/1987 | Sherrod | 718/103 |
| 5,812,844 A | 9/1998 | Jones et al. | |
| 7,458,077 B2 | 11/2008 | Duke | |
| 7,536,689 B2 | 5/2009 | Mangan | |
| 7,853,950 B2 | 12/2010 | Lewis | |
| 2002/0194249 A1 * | 12/2002 | Hsieh | 709/103 |
| 2002/0194250 A1 * | 12/2002 | Hsieh | 709/103 |
| 2005/0251806 A1 * | 11/2005 | Auslander et al. | 718/100 |
| 2007/0169125 A1 * | 7/2007 | Qin | 718/102 |
| 2010/0229179 A1 | 9/2010 | Moore et al. | |
| 2011/0023033 A1 | 1/2011 | Memik et al. | |
| 2011/0225590 A1 * | 9/2011 | Thomson et al. | 718/103 |
| 2011/0289503 A1 * | 11/2011 | Toub et al. | 718/102 |

OTHER PUBLICATIONS

Candea, G.; Jones, M, "Vassal: Loadable Scheduler Support for Mulit-Policy Scheduling" (Aug. 1998), Proceedings of the $2^{nd}$ USENIX Windows NT Symposium, pp. 157-166 [retrieved from http://sites.google.com/site/dslabepfl/pubs/vassal.pdf].*
Rhine, S., "Plug-In Scheduler Policies for Linux" ( May 2001), Proceedings of the InterWorks 2001 HP InterWorks Technical Training Conference & Expo (InterWorks 2001), pp. 1-10 [retrieved from http://www.classiccmp.org/interex/conference/iworks2001/proceedings/3018/3018.pdf].*
Microsoft Computer Dictionary, $5^{th}$ Edition (2002), pp. 518.*
M. V. Panduranga Rao and K. C. Shet, "Analysis of New Multi Level Feedback Queue Scheduler for Real Time Kernel," International Journal of Computational Cognition (http://www.ijcc.us), vol. 8, No. 3, Sep. 2010, pp. 1-12.
"Office Action of German Counterpart Application", issued on Jan. 14, 2014, p. 1-p. 6, in which the listed reference was cited.

* cited by examiner

*Primary Examiner* — Brian W Wathen
(74) *Attorney, Agent, or Firm* — Jianq Chyun IP Office

(57) ABSTRACT

A method for performing thread scheduling in an electronic device having a hardware processor configured for executing an operating system is provided. The operating system includes a thread scheduler and a queue manager. The method includes the following steps. In response to one of a plurality of predefined conditions is met, enable a virtual manager executed by the hardware processor. Receive a request by the thread scheduler for scheduling a thread to be executed. Mask the scheduler by the virtual manager from accessing a first queue including a plurality of first threads in a runnable state. Direct the scheduler to a first virtual queue including a first portion of the plurality of first threads in the first queue for selecting the thread to be executed. The first portion of the first threads associated with at least one application currently running. Schedule execution of the selected thread by the hardware processor.

21 Claims, 9 Drawing Sheets

METHOD AND ELECTRONIC DEVICE FOR THREAD SCHEDULING

BACKGROUND OF THE INVENTION

1. Field of the Invention

The present invention relates to a method and a system for thread scheduling. More particularly, the present invention relates to a method and a system for user-centric thread scheduling.

2. Description of the Related Art

In a modern operating system, a run-queue is maintained in which one thread is chosen as the next scheduled candidate for execution. Concerning fairness, each thread is assigned a time-slice which defines how long at most the thread is able to run at its scheduling interval. Priority is set for each thread as well to determine its execution order. The scheduler of the operating system inserts all runnable threads to a run-queue in prioritized order and picks up the thread with the highest priority as the next scheduled candidate to be executed by the processor.

User experience is a very important aspect of consumer electronic devices, such as smart phones, tablet computers and personal computers. However, the computing resources of a consumer electronic device are limited. When the processor of such a consumer electronic device is executing too many processes or threads at the same time, the user often feels obvious lag.

SUMMARY OF THE INVENTION

Accordingly, the present invention is directed to a method and a system for thread scheduling, which can concentrate the schedule of the processor on the foreground process and the related processes of the operating system to provide friendly and smooth user experience. The method and the system provided by the present invention are simple and easy to implement.

According to an embodiment of the present invention, a method for performing thread scheduling in an electronic device having a hardware processor configured for executing an operating system is provided. The operating system includes a thread scheduler and a queue manager. The method includes the following steps. Determine whether at least one of a plurality of predefined conditions is met. In response to one of the plurality of predefined conditions is met, enable a virtual manager executed by the hardware processor. Receive a request by the thread scheduler for scheduling a thread to be executed. Mask the scheduler by the virtual manager from accessing a first queue including a plurality of first threads in a runnable state. Direct the scheduler to a first virtual queue including a first portion of the plurality of first threads in the first queue for selecting the thread to be executed. The first portion of the first threads associated with at least one application currently running. Schedule execution of the selected thread by the hardware processor.

According to another embodiment of the present invention, a thread scheduling system for use in an electronic device is provided. The thread scheduling system includes a system queue, a thread scheduler, a queue manager, and a virtual manager. The system queue includes a first queue for maintaining a plurality of first threads in a first state and a second queue for maintaining a plurality of second threads in a second state. The thread scheduler is configured to receive request for scheduling execution of at least one of the first threads and updating status of the second threads. The queue manager is configured to receive request for updating threads in the first queue and the second queue. The virtual manager is configured to intercept the request received by the thread scheduler and the queue manager for accessing the first queue, update threads in the first queue and the second queue, and is configured to map the first threads in the first queue into a first virtual queue and a second virtual queue according to a white list associated with at least one application currently running.

According to another embodiment of the present invention, a method for performing thread scheduling in an electronic device having a hardware processor configured for executing an operating system is provided. The operating system includes a run queue and a sleep queue. The method includes the following steps. Generate a white list including processes associated with applications currently running by the hardware processor. Schedule execution of threads in the run queue according to the white list by the hardware processor. Update threads in the sleep queue into the run queue according to the white list by the hardware processor.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
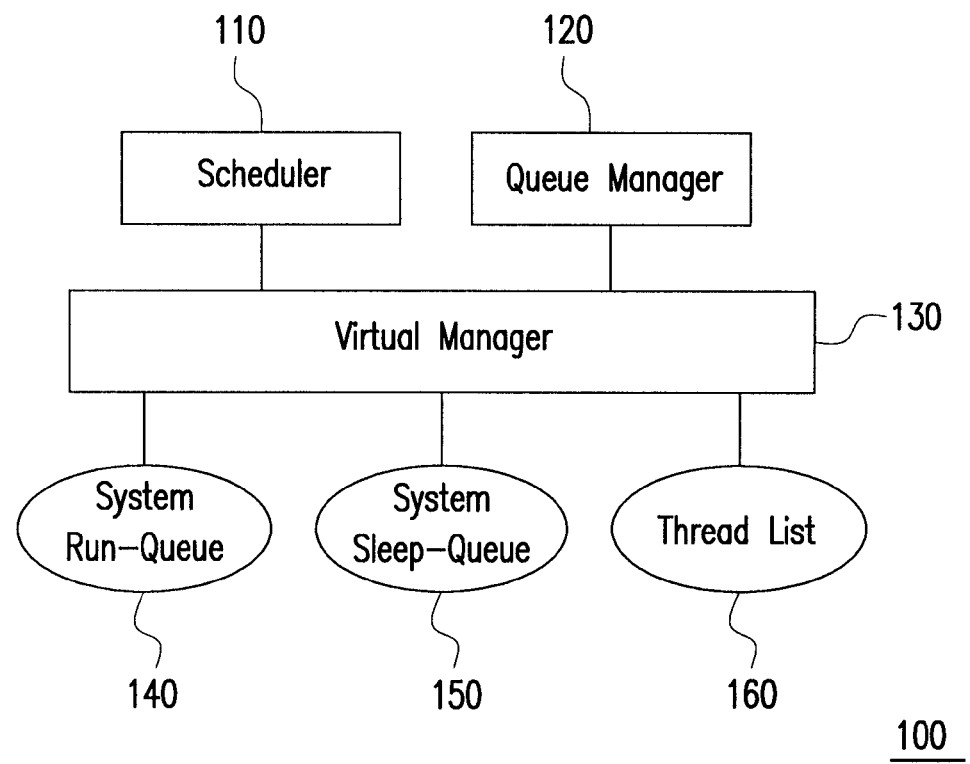
FIG. 1 is a schematic diagram showing a part of an operating system according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic diagram showing a part of an operating system 100 according to an embodiment of the present invention. The operating system 100 is executed by an application processor or other suitable processor of an electronic device. The electronic device may be a smart phone, a personal digital assistant (PDA), a tablet computer, a notebook computer, or a personal computer. The operating system 100 includes a scheduler 110, a queue manager (QM) 120, a virtual manager (VM) 130, a system run-queue 140, a system sleep-queue 150, and a thread list 160.

There may be one or more processes in the operating system 100. Each process may include one or more threads. The thread list 160 records all of the threads in the operating system 100 and the state of each thread. The state of a thread may be running, runnable, sleeping or blocked. The running state means the thread is currently executed by the processor of the electronic device. The runnable state means the thread is ready to be executed by the processor but is not yet running. The blocked state means the thread is waiting for a preset event to occur, such as an interrupt from a hardware component of the electronic device or the release of an exclusive object previously acquired by another thread. The system run-queue 140 records all of the runnable threads, while the system sleep-queue 150 records all of the blocked threads. The system run-queue 140 records the threads in prioritized order, which means the threads in the system run-queue 140 are sorted in order of priority. The first thread of the system run-queue 140 has the highest priority. On the other hand, the threads in the system sleep-queue 150 are sorted according to the lengths of sleep time of the threads. The first thread of the system sleep-queue 150 has the shortest sleep time.

The scheduler 110 arranges thread execution of the processor of the electronic device. In other words, the scheduler 110 determines the execution order of the threads in the operating system 100. The QM 120 deals with all requests which intend to insert or remove threads to or from the system run-queue 140 and the system sleep-queue 150, and ensures the requests are properly serialized.

The VM 130 of the invention is disposed as a middle layer between the scheduler 110, the QM 120, the system run-queue 140, and the system sleep-queue 150. The VM 130 interacts with the thread scheduler 110 and the QM 120 in place of the system run-queue 140 and the system sleep-queue 150. The VM 130 may direct the scheduling of the scheduler 110 to threads with higher importance, for example threads associated with applications user is currently concentrated on so that such processes can be prioritized for execution. The VM 130 may refer to the thread list 160 to inquire the current states of the threads. Furthermore, the VM 130 supports the capability of being installed or uninstalled at runtime transparent to the operating system 100, which means the VM 130 may be enabled or disabled flexibly.

When the VM 130 is disabled, the scheduler 110 and the QM 120 are unaffected by the VM 130 and the operating system 100 behaves just like a conventional multi-tasking operating system. In this case, the scheduler 110 moves the threads which should awake at this moment from the system sleep-queue 150 to the system run-queue 140 in prioritized order, and then the scheduler 110 selects the first thread in the system run-queue 140 as the next thread to be executed by the processor. The selected thread can run for the minimum of its remaining time quantum and/or the sleep time of the first thread in the system sleep-queue 150.

When the VM 130 is enabled, the VM 130 classifies the threads in the system run-queue 140 into two portions and manages the scheduling of thread execution by the processor with reference to the user activities, for example foreground application currently running. The processing details of the VM 130 are discussed below.

Figure 2:
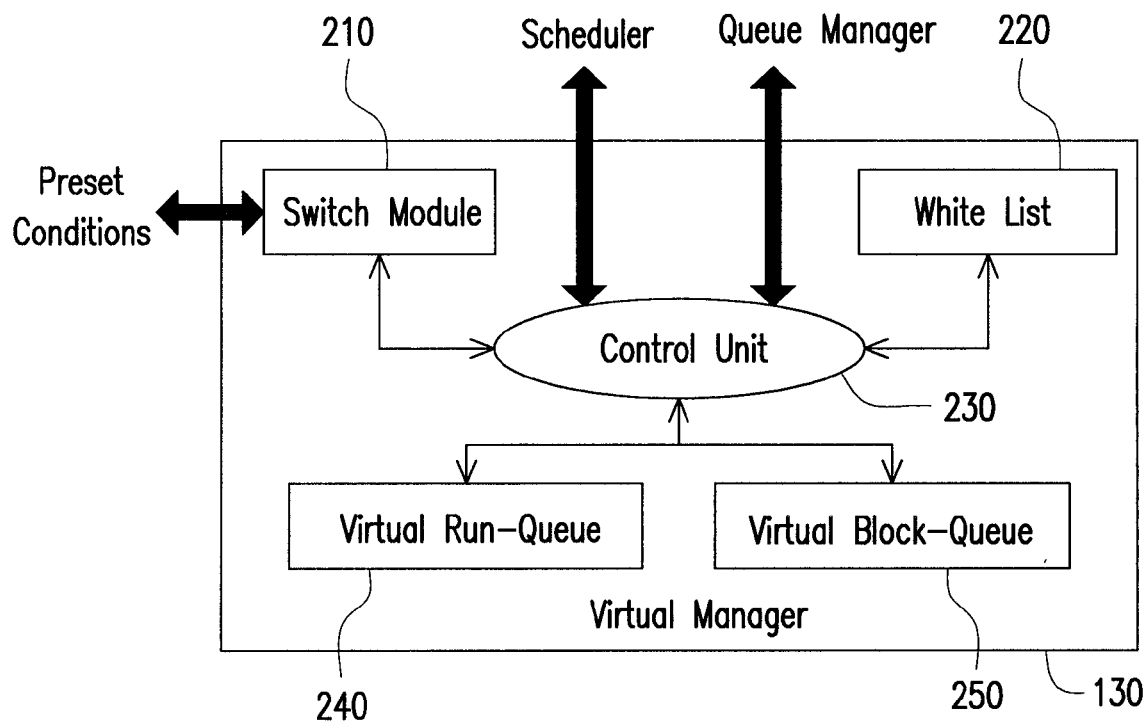
FIG. 2 is a schematic diagram showing a virtual manager according to an embodiment of the present invention.

FIG. 2 is a schematic diagram showing the VM 130 according to an embodiment of the present invention. The VM 130 includes a switch module 210, a control unit 230, a white list 220, a virtual run-queue 240, and a virtual block-queue 250. The switch module 210 monitors some predetermined conditions and disables or enables the VM 130 according to the predetermined conditions. For example, the predetermined conditions may be defined according to, for example, usage of processors, bus traffic, throughputs of processors, and/or other conditions that might affect the efficiency or processing priority. When the utilization percentage of the processor is higher than a first threshold value, the switch module 210 enables the control unit 230 for mapping incoming threads into the virtual run-queue 240 or the virtual block-queue 250, and for redirecting scheduling of incoming requests. When the utilization percentage of the processor is lower than a second threshold value, the switch module 210 disables the control unit 230. The switch module 210 may also disable the control unit 230 in the condition that the display screen is idle over a certain period of time, which suggests that user may not interact with the electronic device, or the display screen is turned off, etc.

In one embodiment of the invention, the control unit 230 may poll the switch module 210 periodically to detect the on/off state of the switch module 210. When the switch module 210 turns on, control unit 230 is enabled and starts executing the method for thread scheduling, whose flow is shown in FIG. 3 to FIG. 9. When the switch module 210 turns off, the control unit 230 is disabled and stops executing the method for thread scheduling. In another embodiment of the invention, the switch module 210 may signal the control unit 230 to be enabled in response to the switch module 210 is in on state, which means at least one of the predetermined conditions is satisfied. Similarly, the switch module 210 may signal the control unit 230 to be disabled when the conditions are released.

When the control unit 230 is enabled, the control unit 230 maps threads in the system run-queue 140 into the virtual run-queue 240 or the virtual block-queue 250 according to the white list 220. When the parent or associated process of a thread in the system run-queue 140 is in the white list 220, the thread is mapped into the virtual run-queue 240. Otherwise, the thread is mapped into the virtual block-queue 250. The white list 220 records processes that are important to the user and/or the operating system 100. In one embodiment of the invention, the white list 220 may include all threads associated with foreground application, services crucial to the operating system, and other important processes that cannot be interrupted. Therefore, threads in the virtual run-queue 240 are those relatively important from user's point of view, while threads in the virtual block-queue 250 are comparatively less important and thus can be delayed for processing.

The white list 220 may include a static white list and a dynamic white list. The static white list may include one or more predetermined processes that are fundamental to the operating system 100 and should not be blocked in any case, such as kernel, file system, and hardware device drivers of the operating system 100. The static white list is fixed, which means processes listed in the static white list would not be changed or removed. The dynamic white list includes other processes that are currently running, for example, foreground process of the operating system 100. The foreground process is the process currently displayed on the screen of the electronic device. As a result, the foreground process should have higher priority than other running processes. Moreover, the foreground process is the application which is currently used by the user and is currently interacting with the user. Processes of background applications that cannot be terminated are added in the dynamic white list as well, for example, audio media playback such as music player, radio, etc. When a requested service is associated with at least one process in the dynamic white list, the process that provides the service is dynamically added into the white list 220. The white list 220 is maintained by the control unit 230 and is updated upon application switch.

For example, when the user is browsing a web site with a browser, the browser is the foreground process. When the user clicks a plug-in of the browser to view a streaming video, the plug-in launches a process to download and play the video and launches another process to play the audio part of the streaming video. Since the browser requests the service of the plug-in and the plug-in requests the services of the download process and the audio-playback process, the control unit 230 adds the plug-in process, the download process and the audio-playback process into the white list 220. Therefore, following requests regarding plug-in, download and audio-playback would be placed into virtual run-queue 240 so that they can be properly scheduled for execution.

The control unit 230 may send a query to the operating system 100 to know which processes are the foreground process and the background processes. This query may be performed periodically or at predetermined moments. For example, the control unit 230 may send the query every time when the control unit 230 is enabled, upon receiving request for scheduling, or occurrence of other conditions. In prior system, when it is time to perform thread rescheduling, the scheduler 110 would check system block-queue 150 and bring threads that have passed sleeping period to runnable state, and choose threads with higher priority in system run-queue 140 for scheduling. However, in the invention the control unit 230 can intercept this intention of the scheduler 110 and redirect the scheduler 110 to select a candidate thread for scheduling from virtual run-queue 240. In addition, when a process is requested for service by a process in the white list 220, at least one thread of the requested process has to be inserted by the QM 120 into the system run-queue 140 to provide the service. When the QM 120 is about to insert a thread into the system run-queue 140, the control unit 230 can intercept this intention of the QM 120 and place the thread into the virtual run-queue 240 or virtual block-queue 250 according to the white list 220.

In addition to the maintenance of the control unit 230, the operating system 100 may provide a dedicated application programming interface (API) for the processes to modify the dynamic white list. A process may add itself or other processes into the dynamic white list by sending a request to the dedicated API. A process may also remove itself or other processes from the dynamic white list by sending another request to the dedicated API. This dedicated API provides more flexibility and efficiency to the construction of the white list 220.

The control unit 230 works by keeping the threads important to the user and the operating system 100 in the virtual run-queue 240 and keeping irrelevant threads in the virtual block-queue 250 temporarily. The control unit 230 concentrates the execution cycles of the processor on the threads of the virtual run-queue 240 to quicken the responses of the threads closely related to the user so the user can feel that all resources are dedicated to him or her and enjoy a smooth experience. The threads in the virtual block-queue 250 are not scheduled for execution temporarily during the activation of the virtual manager 130. The details are recited in the steps of the method for thread scheduling whose flow is shown in FIG. 3 to FIG. 9.

Figure 3:
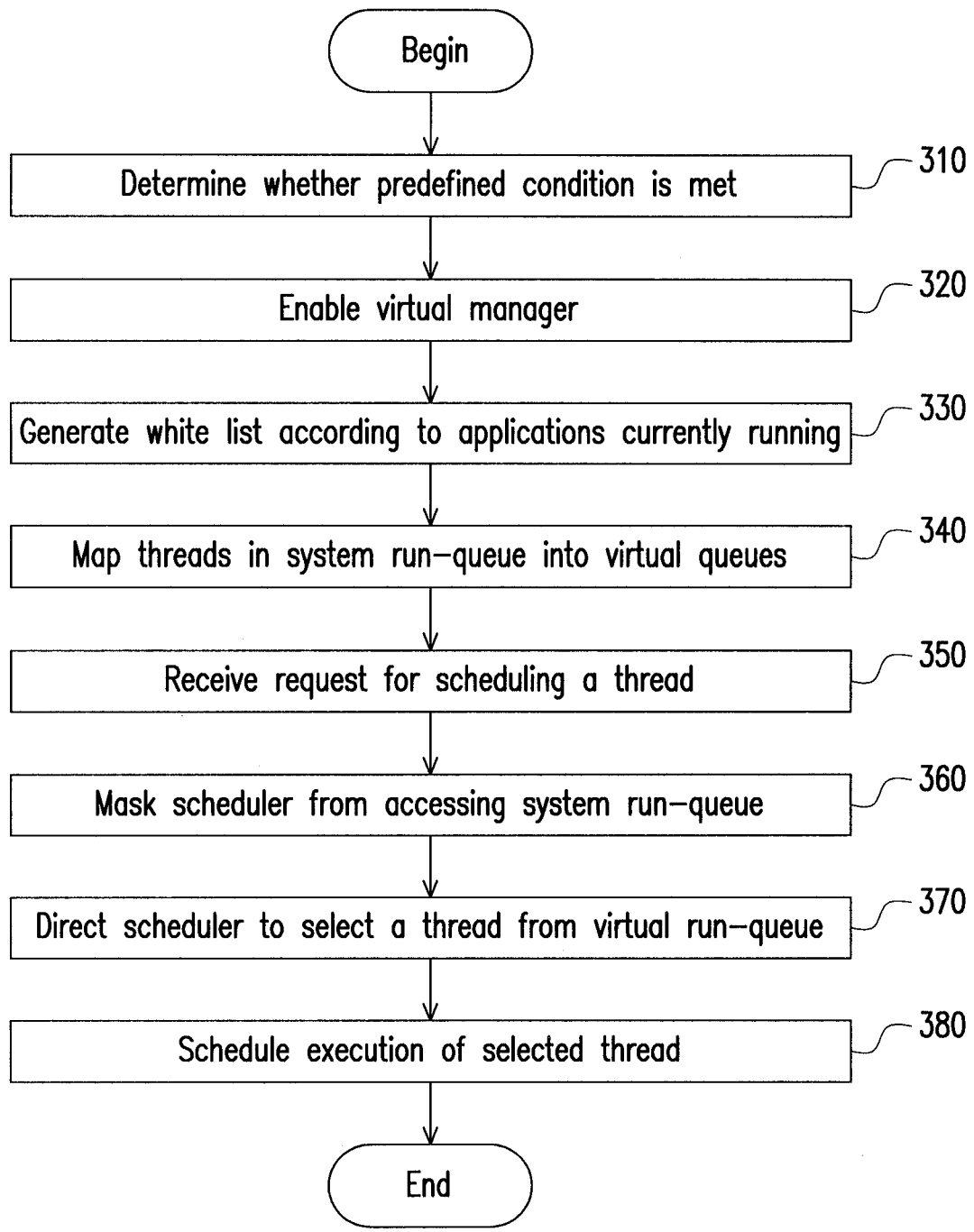
FIG. 3 to FIG. 9 are schematic diagrams showing the flow a method for thread scheduling according to an embodiment of the present invention.

FIG. 3 is a schematic diagram showing the flow of the initialization procedure of the method for thread scheduling according to an embodiment of the present invention. The control unit 230 executes the flow of FIG. 3 to enable the VM 130 in response to the switch module 210 being turned on by a predefined condition. Firstly, at step 310, the switch module 210 determines whether at least one of a plurality of predefined conditions is met. If yes, the switch module is turned on. Meanwhile interrupts of the electronic devices would be masked because the interrupts should be masked temporarily during the initialization procedure to prevent rescheduling in this period so that all the queues can be guaranteed to be consistent. The predefined conditions may include at least one of usage of hardware processor above a predetermined threshold, demand of timing critical applications or services, traffic of a bus coupled to the hardware processor, and throughput of the hardware processor.

Next, at step 320, enable the VM 130 by intercepting the operations of the scheduler 110 and the QM 120 on the system run-queue 140. After the installation, the control unit 230 can intercept various operations of the scheduler 110 and the QM 120 on the system run-queue 140 and execute the flows shown in FIG. 5 to FIG. 8 in response. In the flows shown in FIG. 5 to FIG. 8, the control unit 230 translates the intercepted operations on the system run-queue 140 into operations on the virtual run-queue 240 and the virtual block-queue 250. Any operations on the system sleep-queue 150 is just passed on without any interference since they do not actually affect user experience.

In step 330 the VM 130 generates a white list 220 including processes associated with applications currently running on the electronic device. The white list 220 may include processes associated with foreground application, system critical services, and timing critical background applications or services. Then the VM 130 maps threads in system run-queue 140 which contains threads in runnable state into virtual run-queue 240 and virtual block-queue 250 according to the white list 220 in step 340. Threads that are associated with processes in the white list are mapped to the virtual run-queue 240, while threads not in the white list are mapped into the virtual block-queue 220.

Next, at step 350, a request is received for scheduling a thread to be executed by the thread scheduler 110. The request may be received upon a sleeping thread is about to awake or the execution or time quantum of a running thread is used up. In response to the request, the VM 130 masks the thread scheduler 110 from accessing the system run-queue 140 for selecting and scheduling a thread to be executed in step 360. As described above, normally the thread scheduler 110 would pick up a thread from system run-queue 140 according to the priority. In this embodiment, the VM 130 would intercept the request and direct the thread scheduler 110 to select a thread for execution from the virtual run-queue 240 as shown in step 370. The selected thread may be scheduled for execution by the thread scheduler 110 in step 380.

Figure 4:
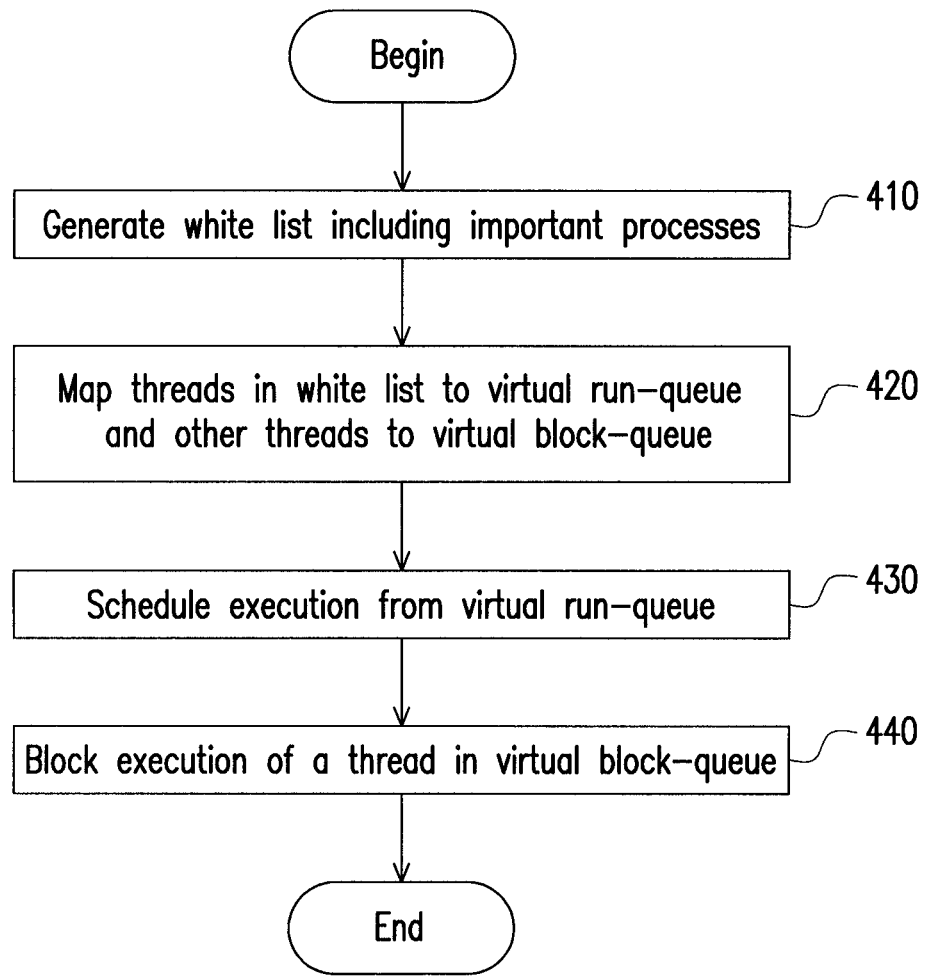

FIG. 4 is a schematic diagram showing the summary flow of the aforementioned method for thread scheduling according to an embodiment of the present invention. Firstly, at step 410, generate the white list 220 in the way discussed above. The foreground process is added into the white list 220, and then any process whose service is requested by at least one process in the white list 220 is also added into the white list 220. Next, at step 420, map the threads of the system run-queue 140 into the virtual run-queue 240 and the virtual block-queue 250 according to the white list 220. The threads in the system run-queue 140 whose parent processes are in the white list 220 are moved into the virtual run-queue 240. The threads in the virtual run-queue 240 are sorted in order of priority. The first thread in the virtual run-queue 240 has the highest priority. The threads in the system run-queue 140 whose parent processes are not in the white list 220 are moved into the virtual block-queue 250. When a thread is inserted into the virtual block-queue 250, the current state of the thread is changed to blocked from runnable or running, and the sleep time of the thread is set to extreme large or infinite. Next, at step 430, in response to receiving a request corresponding to a thread in the virtual run-queue 240, the thread is allowed for execution by the processor. At step 440, in response to receiving a request corresponding to a thread in the virtual block-queue 250, the thread is blocked from execution temporarily. As described above, threads mapped into the virtual run-queue 240 are those associated with important processes to the user, and therefore execution of these threads is placed at high priority. However, threads in the virtual block-queue 250 are not so important for immediate execution, and due to the computation resource shortage, those threads would be block from scheduling to improve overall performance and user experience.

Figure 5:
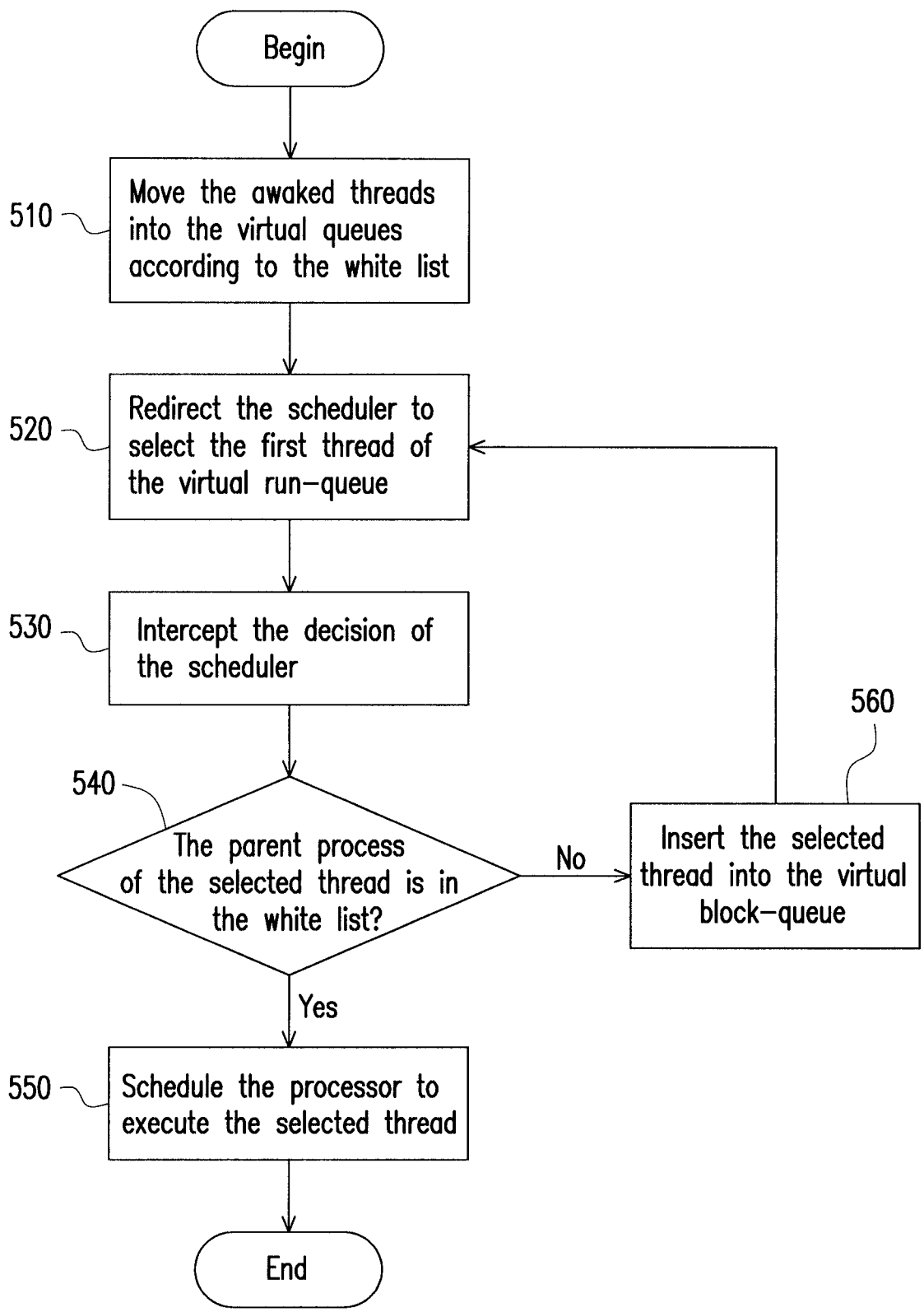

FIG. 5 is a schematic diagram showing a flow of the method for thread scheduling according to an embodiment of the present invention. The control unit 230 executes the flow in FIG. 5 when the scheduler 110 performs the rescheduling of the processor. Firstly, when the rescheduling takes place, the scheduler 110 wakes up the threads which are residing in the system sleep-queue 150 and whose limited sleep periods have expired. At step 510, redirect the scheduler 110 to move the threads which are awaked by the scheduler 110 and whose parent processes are in the white list 220 from the system sleep-queue 150 into the virtual run-queue 240 in prioritized order. In addition, redirect the scheduler 110 to move the threads which are awaked by the scheduler 110 and whose parent processes are not in the white list 220 from the system sleep-queue 150 into the virtual block-queue 250 in prioritized order.

Next, at step 520, redirect the scheduler 110 to select the first thread of the virtual run-queue 240 as the next thread to execute. At step 530, intercept a decision coming from the scheduler 110. The decision includes the thread selected by the scheduler 110.

Next, at step 540, check whether the parent process of the thread selected by the scheduler 110 is in the white list 220 or not. When the parent process of the thread selected by the scheduler 110 is in the white list 220, the flow proceeds to step 550 to schedule the processor to execute the thread selected by the scheduler 110. When the parent process of the thread selected by the scheduler 110 is not in the white list 220, the flow proceeds to step 560 to insert the thread selected by the scheduler 110 into the virtual block-queue 250 in prioritized order and then triggers the selection procedure of the scheduler 110 again to return to step 520.

Figure 6:
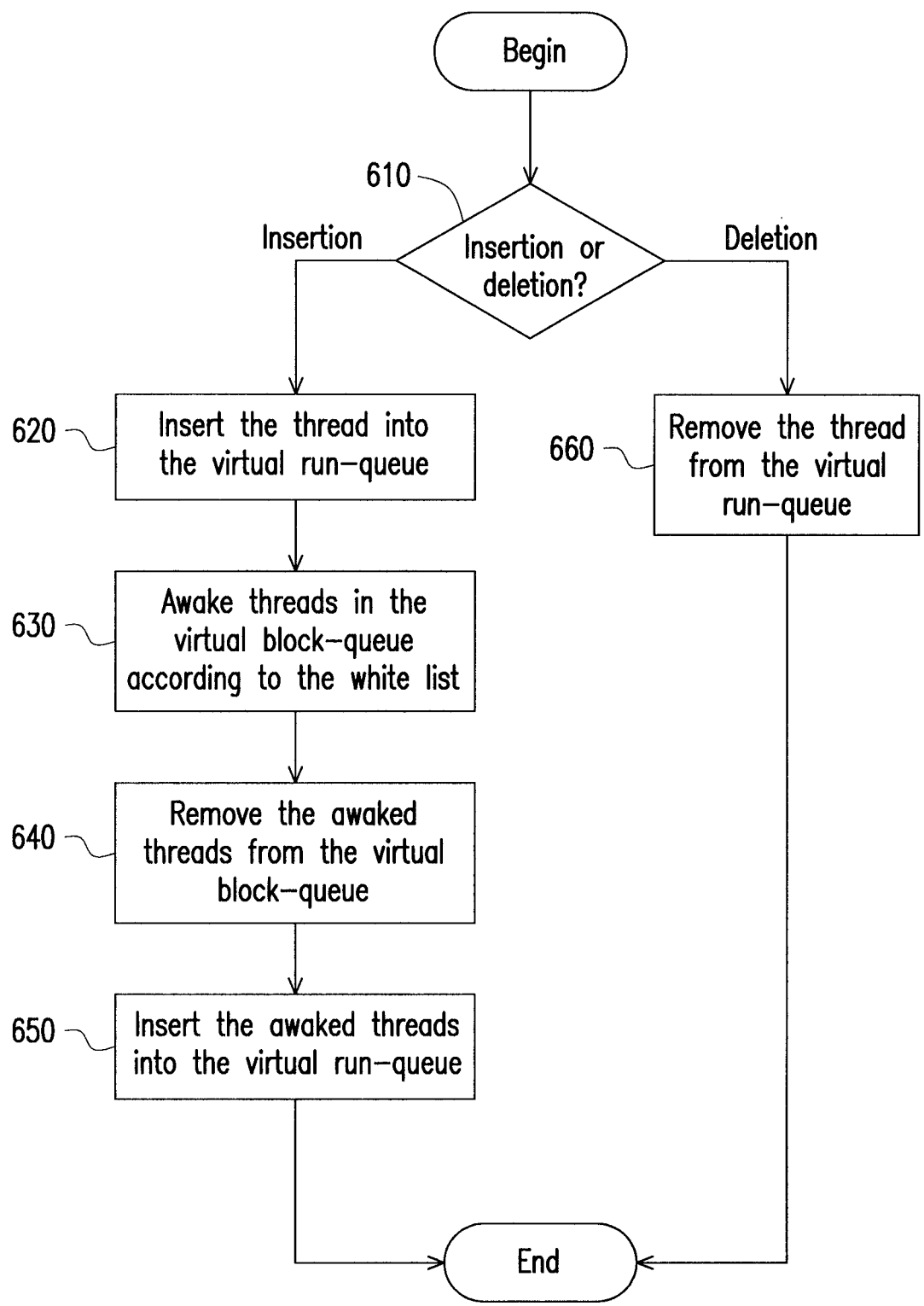

FIG. 6 is a schematic diagram showing a flow of the method for thread scheduling according to an embodiment of the present invention. The control unit 230 executes the flow in FIG. 6 whenever a thread is to be inserted into the system run-queue 140 or deleted from the system run-queue 140 by the QM 120. Firstly, at step 610, check whether the intercepted operation from the QM 120 is an insertion or a deletion. When the intercepted operation is an insertion of a thread, the flow proceeds to step 620 to insert the thread into the virtual run-queue 240 in prioritized order. At step 630, awake the threads in the virtual block-queue 250 whose parent processes are in the white list 220. At step 640, remove the awaked threads from the virtual block-queue 250. At step 650, insert the awaked threads into the virtual run-queue 240 in prioritized order. The purpose of steps 630-650 is moving the threads related to the new foreground process into the virtual run-queue 240 when the foreground process is switched.

At step 610, when the intercepted operation is a deletion of a thread, the flow proceeds to step 660 to simply remove the thread from the virtual run-queue 240.

Figure 7:
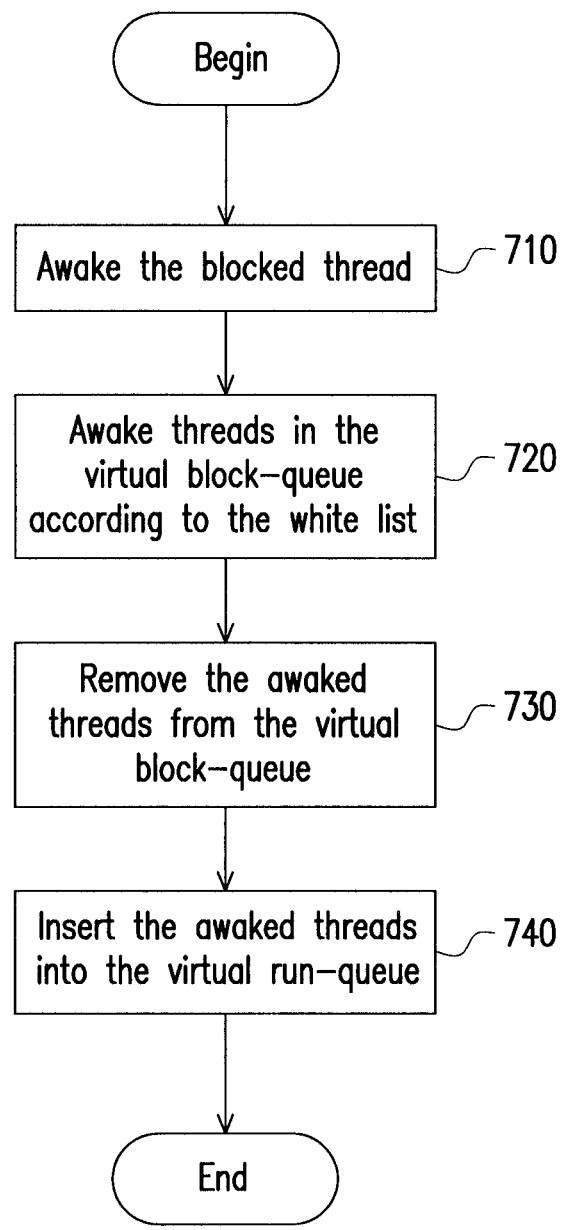

FIG. 7 is a schematic diagram showing a flow of the method for thread scheduling according to an embodiment of the present invention. The control unit 230 executes the flow in FIG. 7 when a running thread (the thread currently executed by the processor) is requesting an exclusive object acquired by a blocked thread in the virtual block-queue 250. The exclusive object may be a shared resource such as a speaker or a printer. Alternatively, the exclusive object may be a synchronization object such as a semaphore, a spinlock or a mutex. There would be a deadlock if this issue is unsolved because, as long as the VM 130 is turned on, the blocked thread in the virtual block-queue 250 would never be run to release the exclusive object. When the running thread must wait for an exclusive object, the QM 120 has to changes the state of the running thread. The control unit 230 can intercept this operation coming from the QM 120 and examine the owner of the exclusive object. Once the owner is found sleeping in the virtual block-queue 250, the control unit 230 executes the flow in FIG. 7 to avoid the deadlock.

Firstly, at step 710, awake the blocked thread. At step 720, awake the threads in the virtual block-queue 250 whose parent processes are in the white list 220. At step 730, remove the threads awaked at steps 710 and 720 from the virtual block-queue 250. At step 740, insert the threads awaked at steps 710 and 720 into the virtual run-queue 240 in prioritized order.

Figure 8:
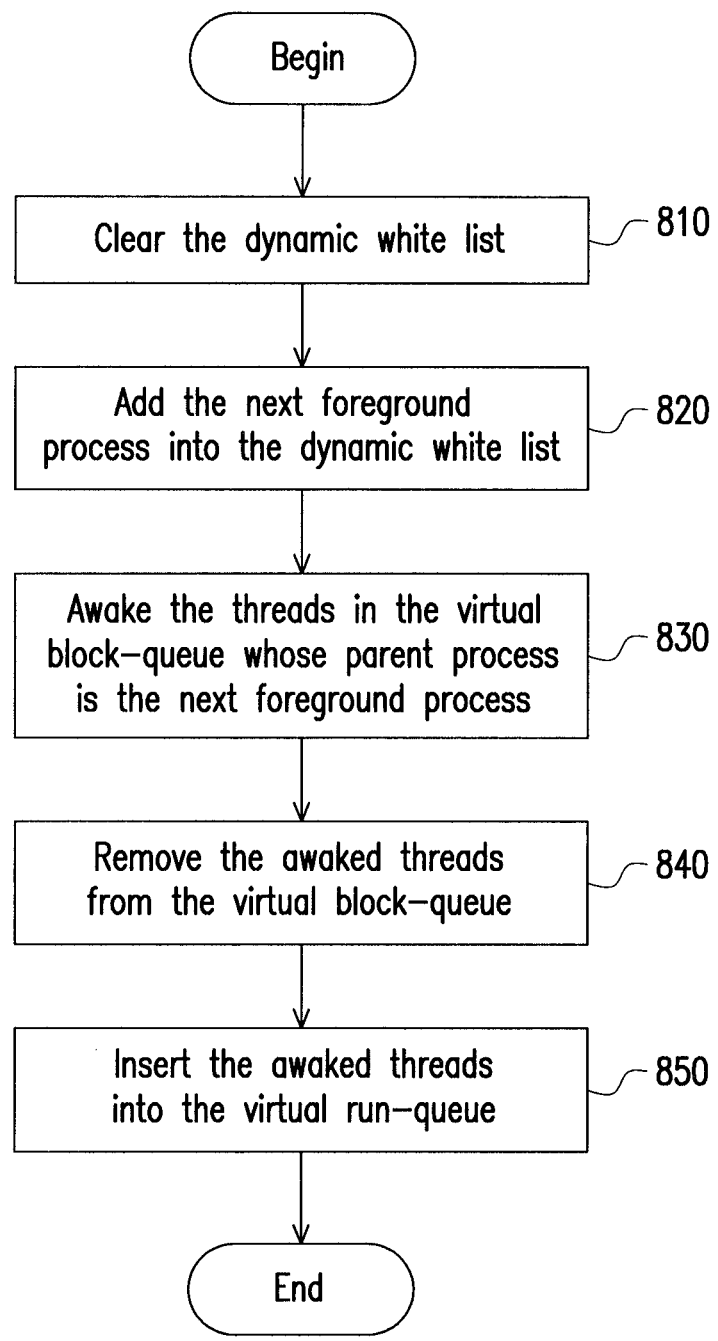

FIG. 8 is a schematic diagram showing a flow of the method for thread scheduling according to an embodiment of the present invention. The control unit 230 executes the flow in FIG. 8 when the foreground process is switched from a previous foreground process to a next foreground process. Firstly, at step 810, clear the dynamic white list. Since the dynamic white list records the processes related to the foreground process, the dynamic white list has to be reset and rebuilt when the foreground process is switched. At step 820, add the next foreground process into the dynamic white list. At step 830, awake the threads in the virtual block-queue 250 whose parent process is the next foreground process. At step 840, remove the awaked threads from the virtual block-queue 250. At step 850, insert the awaked threads into the virtual run-queue 240 in prioritized order. Regarding the threads which were in the dynamic white list of the previous foreground process and are still in the virtual run-queue 240, those threads will be moved to the virtual block-queue 250 in the flow in FIG. 4 at the next rescheduling of the processor.

Figure 9:
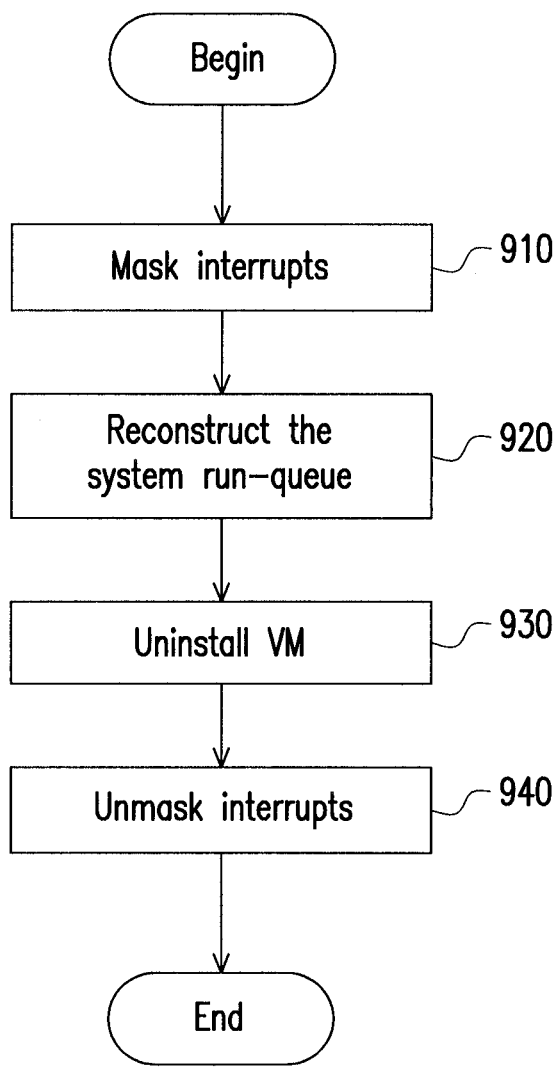

FIG. 9 is a schematic diagram showing a flow of the method for thread scheduling according to an embodiment of the present invention. The control unit 230 executes the flow in FIG. 9 to shut down the VM 130 when the switch module 210 is turned off by a preset condition. The flow in FIG. 9 may be executed after the step 330 in FIG. 3.

Firstly, at step 910, mask the interrupts of the electronic devices to prevent rescheduling and guarantee the consistency of all of the queues. At step 920, reconstruct the system run-queue 140 by merging the threads of the virtual run-queue 240 and the virtual block-queue 250 in prioritized order. The system run-queue 140 becomes empty after the initialization procedure shown in FIG. 4. The scheduler 110 and the QM 120 access the system run-queue 140 directly when the VM 130 is shut down. Therefore, the system run-queue 140 has to be reconstructed. At step 930, uninstall the VM 130 by undoing the intercepting of the operations of the scheduler 110 and the QM 120 on the system run-queue 140 at step 420 in FIG. 4. Any effects of the VM 130 on the scheduler 110, the QM 120, and the operating system 100 are all rolled back. Next, at step 940, unmask the interrupts of the electronic devices. After step 940, the VM 130 is completely shut down and the operating system 100 behaves just like the VM 130 does not exist.

Figure 10:
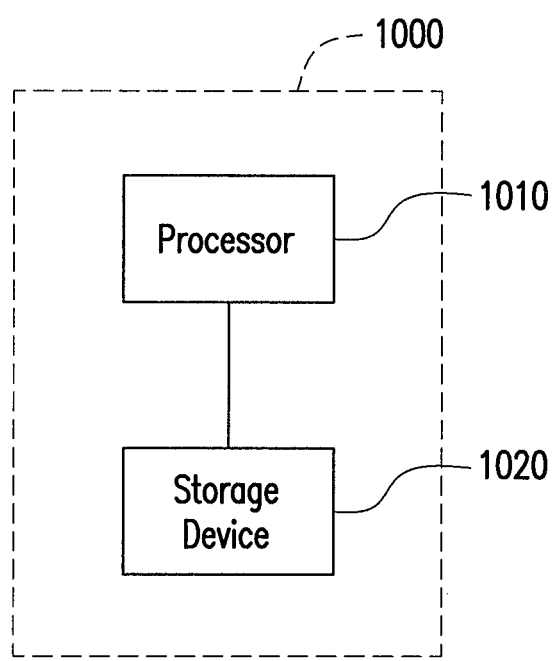
FIG. 10 is a schematic diagram showing an electronic device for thread scheduling according to an embodiment of the present invention.

FIG. 10 is a schematic diagram showing an electronic device 1000 for thread scheduling according to an embodiment of the present invention. The electronic device 1000 includes a processor 1010 and a storage device 1020. The processor 1010 may execute the operating system 100, including the VM 130 and the control unit 230. In other words, the processor 1010 may execute the method for thread scheduling whose flow is shown in FIG. 3 to FIG. 9. The storage device 1020 is coupled to the processor 1010. The storage device 1020 may store the system run-queue 140, the system sleep-queue 150, the virtual run-queue 240, the virtual block-queue 250, and the white list 220.

In summary, the present invention classifies the runnable threads in the operating system according to the relation between the runnable threads and the foreground process, and adjusts the schedule of the processor to concentrate the execution cycles on the threads closely related to the foreground process. As a result, the operation of the foreground process is smooth and responsive, which improves user experience.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for performing thread scheduling in an electronic device having a hardware processor configured for executing an operating system, wherein the operating system comprises a thread scheduler and a queue manager, the method comprising:
   determining whether at least one of a plurality of predefined conditions is met;
   in response to one of the plurality of predefined conditions is met, enabling a virtual manager executed by the hardware processor;
   receiving a request by the thread scheduler for scheduling a thread to be executed;
   masking the scheduler by the virtual manager from accessing a first queue comprising a plurality of first threads in a runnable state;
   directing the scheduler to a first virtual queue comprising a first portion of the plurality of first threads in the first queue for selecting the thread to be executed, the first portion of the first threads associated with at least one application currently running; and
   scheduling execution of the selected thread by the hardware processor.

2. The method of claim 1, further comprising:
   generating a white list comprising processes associated the application currently running by the virtual manager; and
   mapping by the virtual manager the plurality of first threads to the first virtual queue and a second virtual queue according to their dependency on the white list.

3. The method of claim 2, wherein the white list comprises at least one process associated with foreground application, system critical service, timing critical background application or services.

4. The method of claim 2, further comprising:
   updating the white list according to applications currently running on the electronic device.

5. The method of claim 2, further comprising:
   receiving a request for inserting a thread by a queue manager;
   masking the queue manager from accessing the first queue by the virtual manager;
   determining threads in the second virtual queue associated with the inserted thread according to the white list by the virtual manager; and
   moving the inserted thread and associated threads in the second virtual queue into the first virtual queue by the virtual manager.

6. The method of claim 2, further comprising:
   receiving a request to a thread in the first queue by the scheduler;
   intercepting the request by the virtual manager;
   determining whether the requested thread is in the second virtual queue
   in response to the requested thread being in the second virtual queue, determining threads in the second virtual queue associated with the requested thread according to the white list by the virtual manager; and
   moving the requested thread and associated threads in the second virtual queue into the first virtual queue by the virtual manager.

7. The method of claim 2, further comprising
   determining a foreground application currently running on the electronic device;
   in response to the foreground application currently running being switched, updating the white list according to a new foreground application; and
   updating the first virtual queue and the second virtual queue according to the updated white list.

8. The method of claim 2, further comprising:
   determining status change of a plurality of second threads in the second queue by the scheduler, the plurality of second threads being in a sleep state;
   in response to status of at least one of the second threads being changed, sending a request for inserting the second thread with status change to the queue manager;
   intercepting the request for inserting the second thread with status change from the queue manager by the virtual manager; and
   inserting the second thread with status change into the first virtual queue or the second virtual queue according to the white list.

9. The method of claim 1, wherein the predefined conditions comprises at least one of usage of the hardware processor above a predetermined threshold, demand of timing critical application or service, traffic of a bus coupled to the hardware processor, and throughput of the hardware processor.

10. The method of claim 1, further comprising:
    receiving a request for deleting a thread by the queue manager;
    masking the queue manager from accessing the first queue by the virtual manager; and
    removing the deleted thread from the first virtual queue.

11. The method of claim 1, further comprising:
    determining whether the plurality of predefined conditions are released;
    in response to the predefined conditions being released, mapping threads in the first virtual queue and the second virtual queue back to the first queue by the virtual manager; and
    disabling the virtual manager.

12. A thread scheduling system for use in an electronic device, comprising:
    a system queue comprising a first queue for maintaining a plurality of first threads in a first state and a second queue for maintaining a plurality of second threads in a second state;
    a thread scheduler, configured to receive request for scheduling execution of at least one of the first threads and updating status of the second threads;
    a queue manager, configured to receive request for updating threads in the first queue and the second queue; and
    a virtual manager, configured to intercept the request received by the thread scheduler and the queue manager for accessing the first queue, update threads in the first queue and the second queue, and configured to map the first threads in the first queue into a first virtual queue and a second virtual queue according to a white list associated with at least one application currently running.

13. The thread scheduling system of claim 12, wherein the virtual manager further comprises:
a switch module configured to detect a plurality of predefined conditions; and
a control unit configured to be enabled in response to at least one of the plurality of predefined conditions being met, and configured to intercept the request.

14. The thread scheduling system of claim 13, wherein the plurality of predefined conditions comprises at least one of usage of the hardware processor above a predetermined threshold, demand of timing critical application or service, traffic of a bus coupled to the hardware processor, and throughput of the hardware processor.

15. The thread scheduling system of claim 13, wherein the control unit is further configured to mask the thread scheduler from accessing the first queue in response to the thread scheduler receiving the request for scheduling execution of at least one of the first threads, and direct the thread scheduler to the first virtual queue for selecting the first thread to be executed.

16. The thread scheduling system of claim 13, wherein the control unit is further configured to intercept request received by the queue manager for inserting a new thread, mask the queue manager from accessing the first queue, and move into the first virtual queue the new thread and the first threads in the second virtual queue that are associated with the new thread according to the white list.

17. The thread scheduling system of claim 13, wherein the control unit is further configured to update the first virtual queue and the second virtual queue back to the first queue, and configured to be disabled in response to the plurality of predefined conditions are released.

18. The thread scheduling system of claim 12, wherein the white list comprises at least one process associated with foreground application, system critical service, timing critical background application or services.

19. The thread scheduling system of claim 12, wherein the virtual manager is further configured to determine status of the at least one application currently running, and update the white list in response to the at least one application being switched.

20. A method for performing thread scheduling in an electronic device having a hardware processor configured for executing an operating system, wherein the operating system comprises a run queue and a sleep queue, the method comprising:
generating a white list comprising processes associated with applications currently running by the hardware processor;
scheduling execution of threads in the run queue according to the white list by the hardware processor;
updating threads in the sleep queue into the run queue according to the white list by the hardware processor;
mapping threads in the run queue to a virtual run queue and a virtual block queue according to the white list;
selecting a thread to be scheduled for execution from the virtual run queue; and
blocking scheduling of the threads in the virtual block queue temporarily.

21. The method of claim 20, wherein the white list comprises at least one process associated with foreground application, system critical service, timing critical background application or services.

* * * * *